US009950646B2

(12) United States Patent
Katoh et al.

(10) Patent No.: US 9,950,646 B2
(45) Date of Patent: Apr. 24, 2018

(54) VEHICLE SEAT

(71) Applicant: TOYOTA JIDOSHA KABUSHIKI KAISHA, Toyota-shi, Aichi-ken (JP)

(72) Inventors: Kohshi Katoh, Hadano (JP); Eishi Takeuchi, Nagoya (JP); Tsutomu Hamabe, Nisshin (JP); Yasuhiro Suwa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 103 days.

(21) Appl. No.: 14/744,550

(22) Filed: Jun. 19, 2015

(65) Prior Publication Data
US 2015/0367756 A1 Dec. 24, 2015

(30) Foreign Application Priority Data

Jun. 20, 2014 (JP) .................. 2014-127406

(51) Int. Cl.
*B60N 2/22* (2006.01)
*B60N 2/68* (2006.01)
*B60N 2/64* (2006.01)
*B60N 2/66* (2006.01)
*B60N 2/39* (2006.01)
*B60N 2/02* (2006.01)

(52) U.S. Cl.
CPC ............ *B60N 2/22* (2013.01); *B60N 2/2222* (2013.01); *B60N 2/39* (2013.01); *B60N 2/643* (2013.01); *B60N 2/66* (2013.01); *B60N 2/666* (2015.04); *B60N 2/68* (2013.01); *B60N 2002/022* (2013.01); *B60N 2002/0208* (2013.01); *B60N 2002/0212* (2013.01); *B60N 2205/30* (2013.01)

(58) Field of Classification Search
CPC .... B60N 2002/0208; B60N 2002/0212; B60N 2002/022; B60N 2/22; A47C 7/48
See application file for complete search history.

(56) References Cited

U.S. PATENT DOCUMENTS

| 7,637,570 | B2 * | 12/2009 | Becker | A47C 7/28 297/312 |
| 9,114,880 | B2 * | 8/2015 | Guering | A47C 7/405 |
| 2004/0195882 | A1 * | 10/2004 | White | A47C 4/02 297/284.3 |
| 2004/0256899 | A1 * | 12/2004 | Moore | A61F 5/024 297/284.3 |

(Continued)

FOREIGN PATENT DOCUMENTS

| CN | 103732441 A | 4/2014 |
| DE | 102008064466 A1 | 7/2010 |

(Continued)

*Primary Examiner* — Timothy J Brindley
(74) *Attorney, Agent, or Firm* — Andrews Kurth Kenyon LLP

(57) ABSTRACT

A vehicle seat of the present invention includes a seatback frame, a backrest section that supports a back of an occupant, a swivel-coupling section that couples the backrest section and that is capable of swiveling with respect to the seatback frame in a seat width direction, and an outer periphery support section that couples plural locations at an outer peripheral side of the backrest section to the seatback frame, that supports the backrest section with respect to the seatback frame, and that permits the backrest section to swivel.

7 Claims, 10 Drawing Sheets

(56) References Cited

U.S. PATENT DOCUMENTS

| | | | |
|---|---|---|---|
| 2006/0255635 A1* | 11/2006 | Iijima | A47C 7/405 297/284.3 |
| 2009/0102264 A1 | 4/2009 | Fischer et al. | |
| 2010/0187881 A1 | 7/2010 | Fujita et al. | |
| 2014/0159455 A1* | 6/2014 | Thomaschewski | B60N 2/643 297/353 |
| 2014/0191550 A1 | 7/2014 | Katoh et al. | |
| 2015/0238015 A1* | 8/2015 | Hector | A47C 7/48 297/353 |
| 2015/0239381 A1* | 8/2015 | Hamabe | B60N 2/7094 297/313 |
| 2015/0266448 A1* | 9/2015 | Aoki | B60R 22/20 297/313 |
| 2016/0095443 A1* | 4/2016 | Brodbeck | A47C 7/40 297/301.1 |
| 2016/0152166 A1* | 6/2016 | Lorenz | B60N 2/4415 297/257 |
| 2016/0159254 A1* | 6/2016 | Katoh | A47C 1/024 297/313 |

FOREIGN PATENT DOCUMENTS

| | | |
|---|---|---|
| EP | 1630031 A2 | 3/2006 |
| EP | 2743122 A1 | 6/2014 |
| JP | S61-135835 A | 6/1986 |
| JP | H09-164040 A | 6/1997 |
| JP | 2005-138675 A | 6/2005 |
| JP | 2006-175144 A | 7/2006 |
| JP | 2009-000493 A | 1/2009 |
| JP | 2014-057623 A | 4/2014 |
| WO | 2006074780 A1 | 7/2006 |
| WO | 2013/021497 A1 | 2/2013 |

\* cited by examiner

VEHICLE SEAT

CROSS-REFERENCE TO RELATED APPLICATION

This application claims priority under 35 USC 119 from Japanese Patent Application, No. 2014-127406 filed Jun. 20, 2014, the disclosure of which is incorporated by reference herein.

BACKGROUND

Technical Field

The present invention relates to a vehicle seat.

Related Art

In a vehicle seat device described in International Publication (WO) No. 2013/021497, a seatback (backrest section) supporting the back of an occupant is supported by a second frame section (seatback frame) of a seat frame through a seatback support mechanism. The seatback support mechanism is a swivel mechanism including a rotation shaft and a shaft bearing disposed at a position that faces toward the vicinity of the center between the shoulder blades of the occupant, and supports the backrest section so as to be capable of swiveling in the vehicle roll direction. This enables the backrest section to be swiveled to match natural movement of the body of the occupant when the vehicle is turning, or the like, thus enabling steering operation performance and posture retention ability of the occupant to be improved.

However, in the vehicle seat device with the above configuration, only a center portion of the backrest section is supported by the seatback frame through the swivel mechanism. This is therefore not efficient from the perspective of securing rigidity against load input from the occupant to the backrest section.

SUMMARY

In consideration of the above circumstances, the present invention provides a vehicle seat that contributes more efficiently than hitherto to securing rigidity against load input from an occupant to a backrest section, in a configuration in which the backrest section is capable of swiveling with respect to a seatback frame.

A vehicle seat of a first aspect of the present invention includes a seatback frame, a backrest section that supports a back of an occupant, a swivel-coupling section that couples the backrest section and that is capable of swiveling with respect to the seatback frame in a seat width direction, and an outer periphery support section that couples plural locations at an outer peripheral side of the backrest section to the seatback frame, that supports the backrest section with respect to the seatback frame, and that permits the backrest section to swivel.

In the first aspect, the backrest section supporting the back of the occupant is coupled by the swivel-coupling section so as to be capable of swiveling with respect to the seatback frame in the seat width direction. Moreover, plural locations at the outer peripheral side of the backrest section are coupled to the seatback frame by the outer periphery support section. The outer periphery support section supports the backrest section with respect to the seatback frame, and permits the seatback frame to swivel. Plural locations at the outer peripheral side of the backrest section are supported by the seatback frame through the outer periphery support section in this manner, thereby enabling load input from the occupant to the backrest section to be dispersed. Thus the vehicle seat according to the present invention contributes to securing rigidity against load input from the occupant to the backrest section more efficiently than hitherto.

A vehicle seat of a second aspect of the present invention is the first aspect, wherein the backrest section is capable of supporting at least a lumbar spine of the occupant from a group consisting of a thoracic spine and the lumbar spine, and a center of swiveling of the backrest section is set at a height at which the thoracic spine of the occupant is positioned.

In the second aspect, the backrest section is capable of supporting at least the lumbar spine of the occupant from the group consisting of the thoracic spine and the lumbar spine. Note that supporting reactive force from the backrest section that is borne by the occupant acts on the occupant at a center of the integral values of a seated pressure distribution of the backrest section (hereafter referred to as the force application point). The seated pressure on the backrest section is particularly high at the location where the lumbar spine of the occupant is supported, and often, for example, the above force application point is located at a height in the vicinity of the first thoracic vertebra.

Regarding this point, in the present invention, a center of swiveling (hereafter referred to as a swivel center) of the backrest portion in the seat width direction with respect to the seatback frame is set at the height at which the thoracic spine of the occupant is positioned, thus contributing to positioning the swivel center further toward the seatback upper side than the force application point. In cases in which the swivel center is positioned further to the seatback upper side than the force application point, a moment of force that has a moment arm length of the distance between the swivel center and the force application point is generated when an external force in the seat width direction acts on the upper body of the occupant due to turning of the vehicle, or the like. This enables the backrest section to be swiveled toward the direction of action of the external force.

A vehicle seat of a third aspect of the present invention is the second aspect, wherein the swivel-coupling section is a suspension section that suspends a location at the center of swiveling of the backrest section from the seatback frame.

In the third aspect, the location at the center of swiveling of the backrest section in the seat width direction with respect to the seatback frame is suspended from the seatback frame by the suspension section. This thereby enables the swivel-coupling section to be formed with a simple configuration.

A vehicle seat of a fourth aspect of the present invention is the first aspect, wherein the outer periphery support section respectively couples together the seatback frame both seat width direction end portions at an upper end portion of the backrest section, and a seat width direction center portion at a lower end portion of the backrest section.

In the fourth aspect, both seat width direction end portions at the upper end portion of the backrest section and the seat width direction center portion at the lower end portion of the backrest section are supported by the seatback frame at three points. This thereby enables support of the backrest section to be stabilized using a simple configuration.

A vehicle seat of a fifth aspect of the present invention is the first aspect, wherein the backrest section includes a sub-frame that configures an outer peripheral section of the backrest section and that is coupled to the seatback frame by the swivel-coupling section and the outer periphery support section, and an elastic extension-contraction member that is stretched across the sub-frame.

In the fifth aspect, the back of the occupant can be supported to as to be wrapped around by the elastic extension-contraction member stretched across the sub-frame, while using the sub-frame (frame) to secure the rigidity in the backrest section at the outer peripheral section that is coupled to the seatback frame.

A vehicle seat of a sixth aspect of the present invention is the first aspect, further including a biasing member that biases the backrest section toward a central side of a swiveling range with respect to the seatback frame.

The sixth aspect enables the backrest section that swivels in the seat width direction with respect to the seatback frame to be returned to the central side of the swiveling range (centered) with respect to the seatback frame by the biasing force of the biasing member. This enables the orientation of the backrest section to be corrected when the occupant alights from the vehicle, and so on.

A vehicle seat of a seventh aspect of the present invention is the first aspect, further including an adjustment mechanism that adjusts a position in a seatback up-down direction of a center of swiveling of the backrest section.

In the seventh aspect, the position in the seatback up-down direction of the center of swiveling of the backrest section in the seat width direction can be varied (adjusted) with respect to the seatback frame according to the build, the preferences, and so on of the occupant.

BRIEF DESCRIPTION OF DRAWINGS

Exemplary Embodiments of the present invention will be described in detail based on the following figures, wherein.

DETAILED DESCRIPTION

First Exemplary Embodiment

Figure 1:
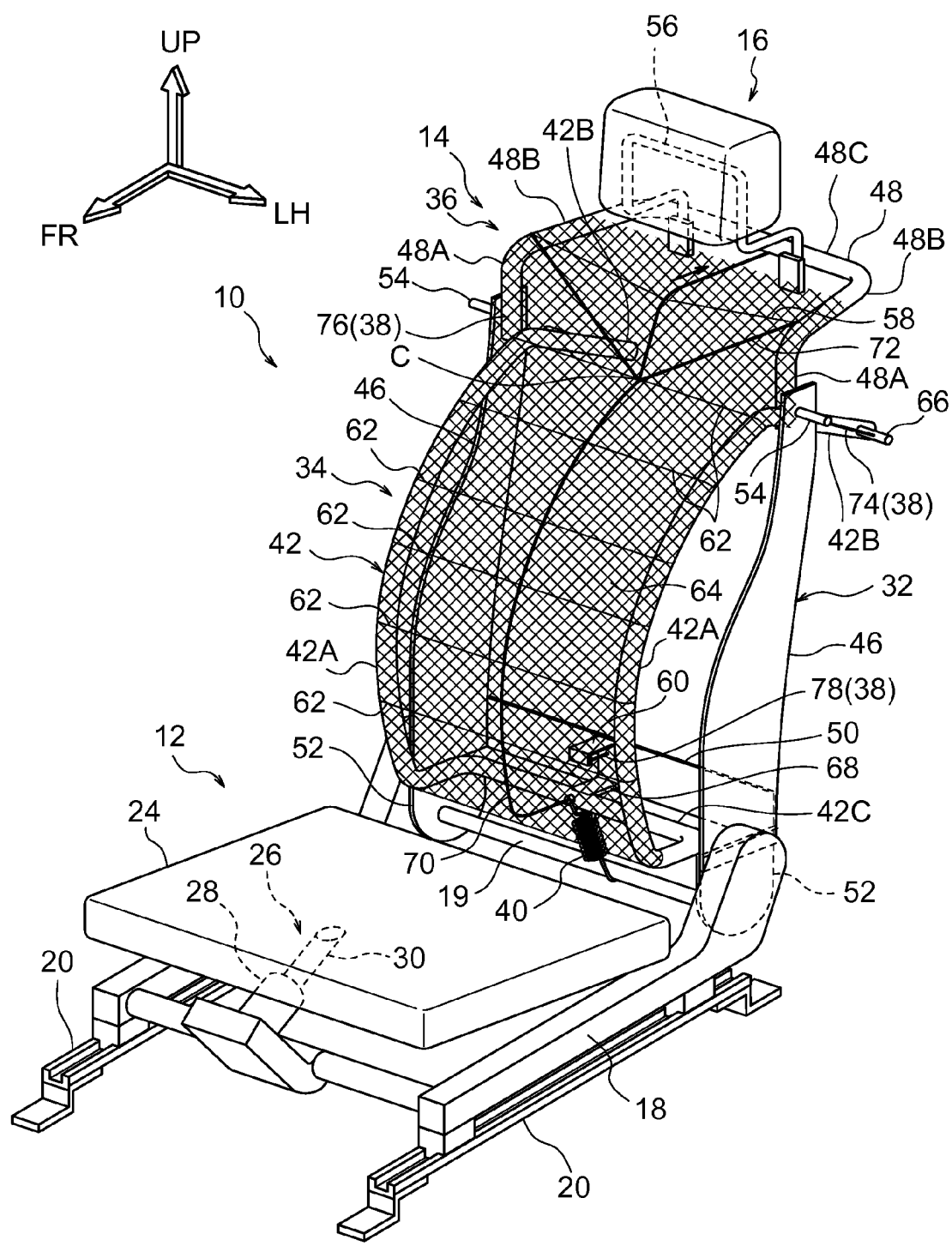
FIG. 1 is a perspective view of a vehicle seat according to a first exemplary embodiment of the present invention.
Figure 2:
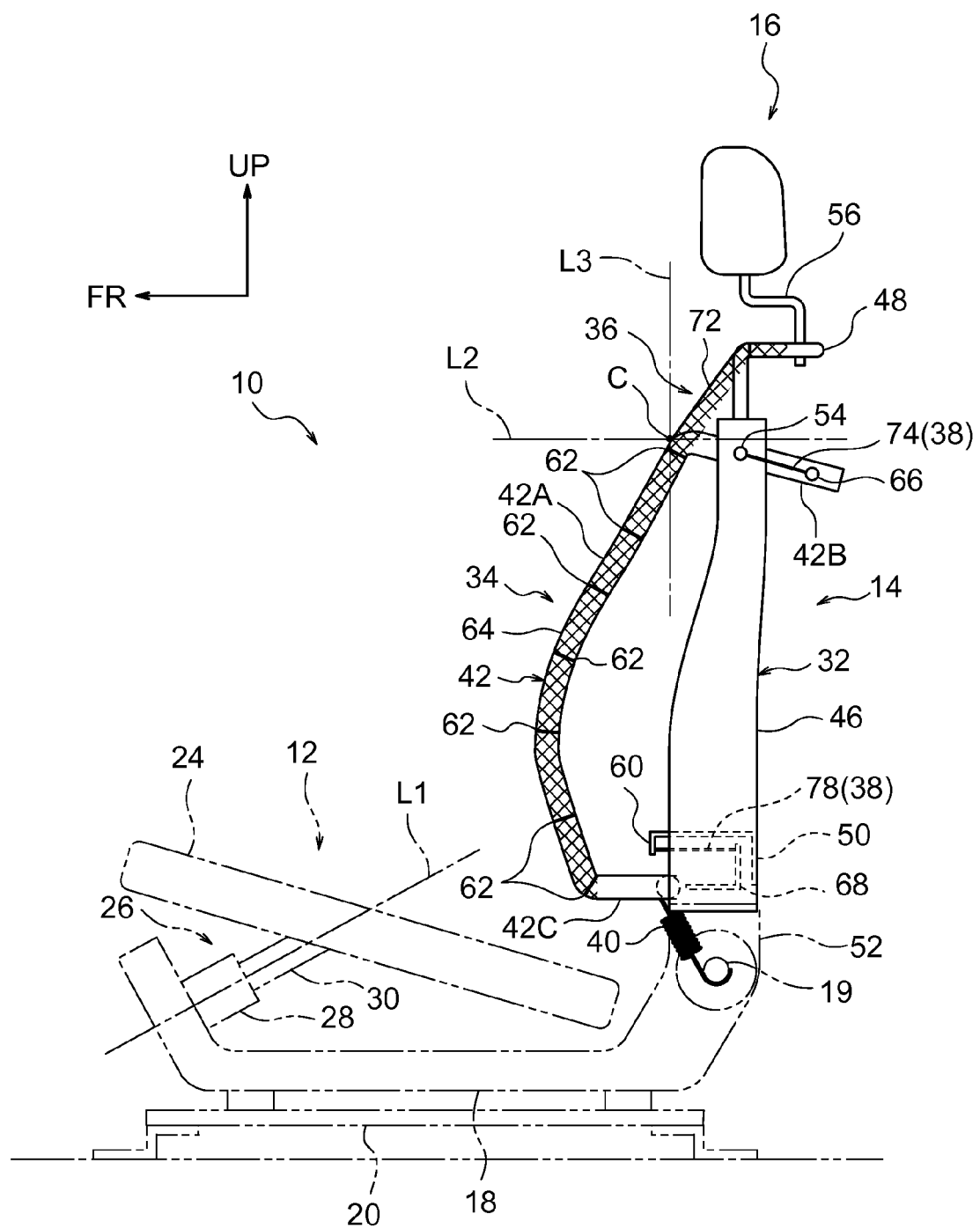
FIG. 2 is a side view of the same vehicle seat.
Figure 3:
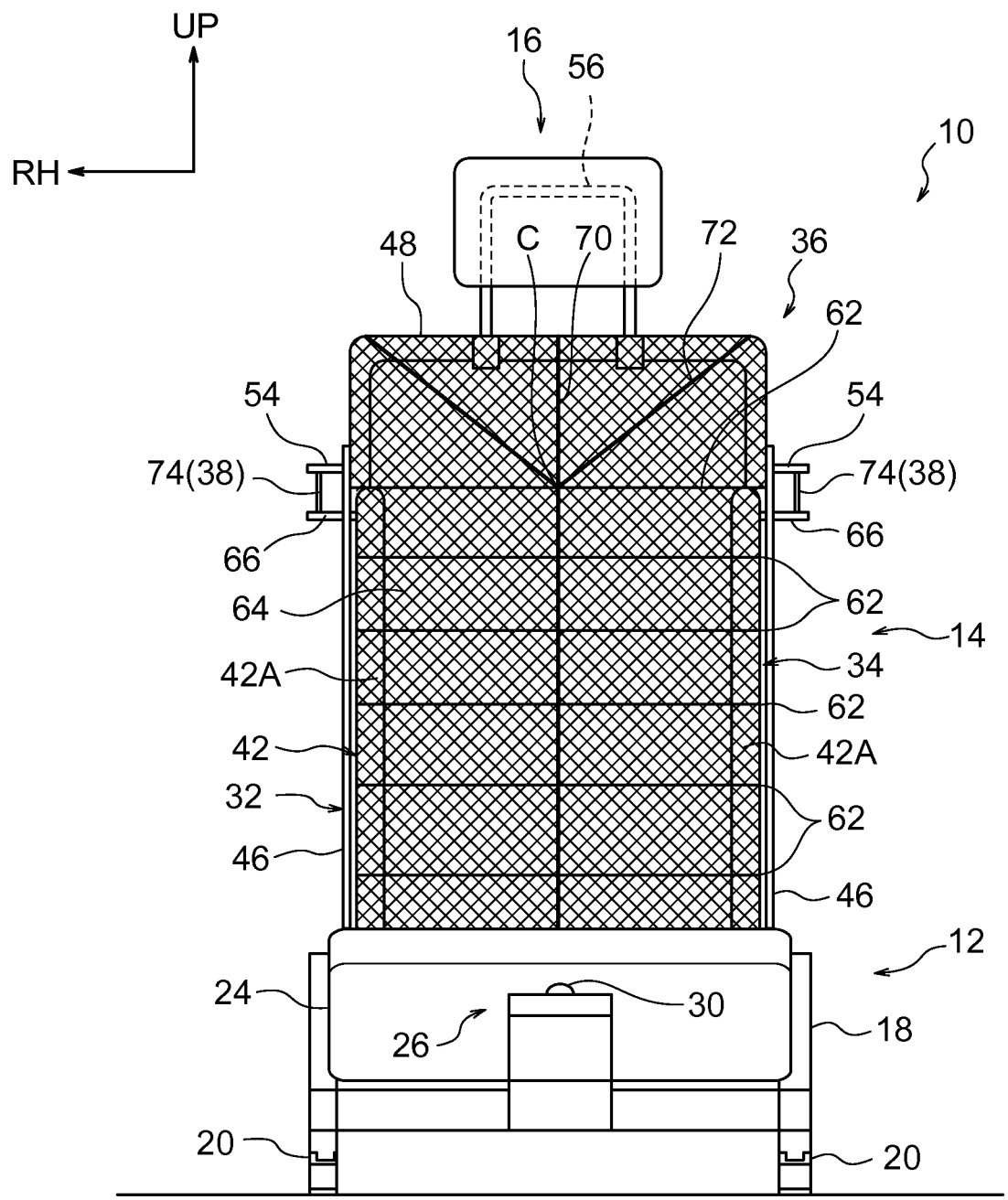
FIG. 3 is a front view of the same vehicle seat.

Explanation follows regarding a vehicle seat 10 according to a first exemplary embodiment of the present invention, with reference to FIG. 1 to FIG. 7. Note that, in each of the drawings as appropriate, the arrow FR, the arrow UP, the arrow LH, and the arrow RH indicate the front direction (progress direction), upward direction, left direction, and right direction, respectively, of a vehicle. Unless otherwise specified, explanation using simply the front and rear, left and right, and up and down directions indicates the front and rear in the vehicle front-rear direction, the left and right in the vehicle left-right direction (vehicle width direction), and up and down in the vehicle up-down direction, respectively.

Configuration

As illustrated in FIG. 1 to FIG. 4, the vehicle seat 10 according to the present exemplary embodiment includes a seat cushion 12 acting as a vehicle seat cushion supporting the buttocks and thighs of an occupant, and a seatback 14 acting as a vehicle seatback supporting the back of the occupant. A headrest 16 supporting the head of the occupant is attached to an upper end portion of the seatback 14. The front-rear, left-right, and up-down directions of the vehicle seat 10 are aligned with the front-rear, left-right, and up-down directions of the vehicle.

Note that in the present exemplary embodiment, explanation follows regarding a case in which the vehicle seat 10 is a driver seat; however the vehicle seat 10 may also be applied to a vehicle seat other than the driver seat, such as a front passenger seat. In the present exemplary embodiment, for ease of explanation, an occupant with a similar build to an AM50 is envisaged sitting with a standard posture in the vehicle seat 10 in order to explain a relationship between the vehicle seat 10 and the occupant; however there is no particular limitation to the build of the occupant. The back of the occupant refers to a portion of the body including the lumbar region and the back, the lumbar region refers to a portion of the body including the lumbar spine and trunk muscle surrounding the lumbar spine, and the vicinity of the lumbar region refers to the lumbar region itself and a portion of the body surrounding the lumbar region. The chest refers to a portion of the body including the thoracic spine and muscle surrounding the thoracic spine, and the shoulders refers a portion of the body from the shoulder blades to the shoulders.

The seat cushion 12 includes a seat cushion frame 18 that is a frame member. The seat cushion frame 18 is frame shaped in plan view, and is coupled to a floor 22 of the vehicle body through a pair of left and right slide rails 20. A seat unit 24 that supports the buttocks (pelvis) and the thighs (femurs) of the occupant is disposed above the seat cushion frame 18. The seat unit 24 is coupled to (supported by) the seat cushion frame 18 through a seat unit support mechanism 26 attached to a front end portion of the seat cushion frame 18.

The seat unit support mechanism 26 is a swivel mechanism including a shaft bearing 28 fixed to the seat cushion frame 18, and a rotation shaft 30 fixed to the seat unit 24 and rotatably coupled to the shaft bearing 28. The respective axial directions of the rotation shaft 30 and the shaft bearing 28 are disposed so as to slope upward toward the rear with respect to the vehicle front-rear direction. Thus the seat unit 24 is coupled to the seat cushion frame 18 so as to enable swiveling in the roll direction and yaw direction of the vehicle with respect to the seat cushion frame 18. A swivel axis L1 (a hypothetical line, see FIG. 2) of the seat unit 24 slopes within a range of 60°±15° with respect to the vehicle up-down direction, and is set so as to pass through the vicinity of the lumbar region of an occupant seated in the vehicle seat 10.

Note that the seat cushion frame 18, the seat unit 24, and the seat unit support mechanism 26 have similar configurations to the first seat frame section, the seat unit, and the seat support mechanism of the vehicle seat device explained in the Related Art, and so detailed explanation is omitted. Moreover, configuration of the seat cushion 12 may be changed as appropriate, and the seat unit 24 may be fixed with respect to the seat cushion frame 18.

The seatback 14 is configured by principal portions of a seatback frame (main frame) 32, a backrest section 34 that supports the back of the occupant, a suspension section (swivel-coupling section) 36 that couples the backrest section 34 so as be capable of swiveling with respect to the seatback frame 32, an outer periphery support section 38 that couples plural locations at the outer peripheral side of the backrest section 34 to the seatback frame 32, and a tension coil spring (biasing member) 40 spanning across between a lower end portion of the backrest section 34 and the seat cushion frame 18. Note that the front-rear direction of the seatback 14 is orthogonal to the up-down direction (height direction) of the seatback 14 in seat side view. Moreover, the width direction of the seatback 14 is aligned with the seat width direction and the vehicle width direction.

The seatback frame 32 is formed with a frame shape as viewed in the seatback front-rear direction, and is configured by a sub-frame 42, described later, together with the frame of the seatback 14. The seatback frame 32 includes a pair of left and right side frame sections 46, an upper frame section 48, and a lower frame section 50.

The left and right side frame sections 46 extend in the seatback up-down direction at left and right side sections of the seatback 14. Lower end portions of the left and right side frame sections 46 are tiltably coupled to a rear end portion of the seat cushion frame 18 through brackets 52 and a reclining mechanism, not illustrated in the drawings. Circular bar shaped wire fixing sections 54 are fixed by a means such as welding to respective upper end portions of the left and right side frame sections 46. The wire fixing sections 54 protrude out from the upper end portions of the left and right side frame sections 46 toward the seat width direction outside.

The upper frame section 48 is disposed at the upper end portion of the seatback 14, and couples the upper end portions of the left and right side frame sections 46 together in the seat width direction. As illustrated in FIG. 1, the upper frame section 48 is fixed to the upper end portions of the left and right side frame sections 46, and is configured including left and right leg portions 48A extending from the left and right side frame sections 46 toward the seatback upper side, left and right rear extension portions 48B extending from respective upper end portions of the left and right leg portions 48A toward the seatback rear side, and a width direction coupling portion 48C that couples rear end portions of the left and right rear extension portions 48B together in the seat width direction. A headrest frame 56, configuring the frame of the headrest 16, is coupled to the width direction coupling portion 48C.

An upper end cross-cord member 58, acting as a posture retaining extension-contraction member, is provided stretched along the seat width direction at the upper end portions of the left and right leg portions 48A of the upper frame section 48. The upper end cross-cord member 58 is a flexible and extendible/contractible linear shaped (cord shaped) member, and each of the end portions thereof in the seat width direction are fixed to the respective upper end portions of the left and right leg portions 48A. Nylon thread, polyethylene thread, carbon thread, wire, or the like may be used as material for the upper end cross-cord member 58.

The lower frame section 50 is disposed at a lower end portion of the seatback 14, and couples the lower end portions of the left and right side frame sections 46 along the seat width direction. A wire fixing section 60, formed of sheet metal or the like, is fixed to a seat width direction center portion of the lower frame section 50. The wire fixing section 60 protrudes out from the seat width direction center portion of the lower frame section 50 toward the seatback front side, and a front end portion thereof bends toward the lower side.

The height dimension of the seatback frame 32 with the above configuration is set such that, for example, an upper end of the seatback frame 32 is positioned at a similar height to an upper end of the shoulders of an occupant seated in the vehicle seat 10. In the present exemplary embodiment, the left and right side frame sections 46 and the lower frame section 50 are formed from sheet metal, and the upper frame section 48 is formed of a metal pipe; however configuration is not limited thereto, and the material of each of the frame portions above may be varied as appropriate. Moreover, in FIG. 1 to FIG. 4, the left and right side frame sections 46 and the lower frame section 50 are illustrated as flat plate shapes; however configuration is not limited thereto, and the cross-section shape of each of the frame portions above may be varied as appropriate.

The backrest section 34 is disposed at the seatback front side with respect to the seatback frame 32. The backrest section 34 is configured by the sub-frame 42 that is a frame member, plural cross-cord members 62 that are extension-contraction members, and a net form member 64.

The sub-frame 42 is formed, for example, by metal pipe bending, and a dimension in the seatback up-down direction is set smaller than the seatback frame 32. An upper end of the sub-frame 42 is disposed at a similar height to upper ends of the left and right side frame sections 46, and a lower end thereof is disposed at a similar height to lower ends of the left and right side frame sections 46. The sub-frame 42 includes left and right side sections 42A, left and right upper sections 42B, and a lower section 42C that is formed in an inverted substantially U shape as viewed from the seatback front-rear direction, and that is formed in a substantially C shape open toward the seatback rear side viewed from the seatback width direction The left and right side sections 42A extend along the seatback up-down direction at left and right side sections of the seatback 14, and curve in a convex arc toward the seatback front side as viewed from the seat width direction. The left and right upper sections 42B extend from respective upper end portions of the left and right side sections 42A toward the seatback rear side and with a slight incline toward the lower side, so as to protrude out further to the seatback rear side than the left and right side frame sections 46 of the seatback frame 32. Circular bar shaped wire fixing sections 66 are fixed by a means such as welding to respective rear end portions of the left and right upper sections 42B. The wire fixing sections 66 protrude out from the respective rear end portions of the left and right upper sections 42B toward the seat width direction outside, and face toward the previously described left and right wire fixing sections 54, from a position that is at the seatback rear side of, and inclined slightly toward the lower side of, the right wire fixing sections 54.

The lower section 42C extends along the seat width direction at the lower end portion of the seatback 14, and couples lower end portions of the left and right side sections 42A together along the seat width direction. The lower section 42C is formed in a substantially U shape open toward the seatback front side as viewed from the seatback up-down direction, so as to protrude out from the lower end portions of the left and right side sections 42A toward the seatback rear side. The lower section 42C faces the lower frame section 50 of the seatback frame 32 from the seatback front side. A wire fixing section 68, formed from sheet metal or the like, is fixed to a seat width direction center portion of the lower section 42C. The wire fixing section 68 protrudes out from the seat width direction center portion of the lower section 42C toward the seatback rear side, and a rear end portion thereof bends toward the upper side. The wire fixing section 68 is disposed at the seatback lower side with respect to the previously described wire fixing section 60, and the rear end portion thereof faces the front end portion of the wire fixing section 60 from the seatback rear.

Similarly to the upper end cross-cord member 58 previously described, the plural cross-cord members 62 are flexible and extendible/contractible linear shaped (cord shaped) members, and are provided stretching along the seat width direction between the left and right side sections 42A. Both seat width direction end portions of each cross-cord member 62 are fixed to the left and right side sections 42A, and the cross-cord members 62 are disposed alongside each other at regular intervals, or substantially regular intervals, in the seatback up-down direction. Nylon thread, polyethylene thread, carbon thread, wire, or the like may, for example, be used as material for the cross-cord members 62. Together with the upper end cross-cord member 58, the cross-cord members 62 configure posture retaining extension-contraction members, and perform the role of retaining the posture of an occupant leaning against the seatback 14.

The net form member 64 is a flexible and extendible/contractible net form member, and is provided stretching along the seat width direction between the left and right side sections 42A, similarly to the plural cross-cord members 62. Both seat width direction end portions of the net form member 64 are fixed to the left and right side sections 42A, and the net form member 64 covers the sub-frame 42 and the plural cross-cord members 62. An upper edge portion of the net form member 64 extends along an upper portion side of the seatback frame 32 and is fixed to the upper frame section 48, and the net form member 64 covers an upper portion of the seatback frame 32 and the upper end cross-cord member 58. A surface layer (surface) of the seatback 14 is formed by the net form member 64. Reference in the below explanation to a "seatback shear direction" refers to a direction running along this surface layer, this being a direction that is substantially orthogonal with respect to the seatback front-rear direction (a direction at right angles to the seatback plane).

The suspension section 36 supports the backrest section 34 suspended from the seatback frame 32, and is configured by a vertical-cord portion 70 and a cross-cord portion 72. Similarly to the upper end cross-cord member 58 and the plural cross-cord members 62, the vertical-cord portion 70 and the cross-cord portion 72 are configured by flexible and extendible/contractible linear shaped (cord shaped) members. Nylon thread, polyethylene thread, carbon thread, wire, or the like may be used as material for the vertical-cord portion 70 and the cross-cord portion 72.

The vertical-cord portion 70 extends along the seatback up-down direction at a seat width direction center portion of the seatback 14. The vertical-cord portion 70 is fixed (joined) to a seat width direction intermediate portion of the upper end cross-cord member 58 and the plural cross-cord members 62, and couples the upper end cross-cord member 58 and the plural cross-cord members 62 together in the seatback up-down direction. The vertical-cord portion 70 extends from the upper end cross-cord member 58 toward the seatback rear side, and is fixed to a seat width direction intermediate portion of the width direction coupling portion 48C of the upper frame section 48. The vertical-cord portion 70 also extends from the cross-cord members 62 disposed at the lower end portion of the backrest section 34 toward the seatback rear side, and is fixed to a seat width direction center portion at a lower portion of the sub-frame 42.

The cross-cord portion 72 is stretched across (spans) between the upper end portions of the left and right leg portions 48A of the upper frame section 48 of the seatback frame 32, and each of the seat width direction end portions of the cross-cord portion 72 are fixed to the respective upper end portions of the left and right leg portions 48A. A seat width direction center portion of the cross-cord portion 72 bends toward the seatback lower side so as to form a V shape as viewed from the seatback front side. The seat width direction center portion of the cross-cord portion 72 is fixed to a seat width direction center portion of the cross-cord member 62 disposed at the upper end portion of the backrest section 34, and to the vertical-cord portion 70. The seat width direction center portion at the upper end portion of the backrest section 34 is positioned by the cross-cord portion 72 in the seat width direction (seat left-right direction) and in the seatback up-down direction with respect to the seatback frame 32.

The vertical-cord portion 70 and the cross-cord portion 72 are covered by the previously described net form member 64. The backrest section 34 is suspended from the seatback frame 32 by the vertical-cord portion 70 and the cross-cord portion 72. Note that, since the backrest section 34 is efficiently positioned (supported) by the cross-cord portion 72 in the seatback up-down direction and the seatback front-rear direction, a configuration may be applied in which the vertical-cord portion 70 is omitted.

The outer periphery support section 38 is configured by plural (three in this example) wires (spanning members: tensile members) 74, 76, 78. The wires 74, 76, which are provided to each seat width direction end portion at an upper portion of the seatback 14, span across between the respective wire fixing sections 54 and the headrest frame 56. The wires 74, 76 are provided so as to be positioned further to the seat width direction outside than the shoulders of an occupant leaning against the backrest section 34. The wire 78, provided at a seat width direction center portion at the lower end portion of the seatback 14, spans across between the front end portion of the wire fixing section 60 and the rear end portion of the wire fixing section 68.

Thus both seat width direction end portions at the upper end portion of the backrest section 34, and the seat width direction center portion at the lower end portion of the backrest section 34 are coupled by the respective wires 74, 76, 78 to the seatback frame 32. The wires 74, 76, 78 restrict displacement of the backrest section 34 toward the seatback rear side with respect to the seatback frame 32, and also restrict displacement thereof toward the seatback front side and to within a specific range in the seatback width direction.

One end portion (an upper end portion) of the tension coil spring 40 is anchored to the seat width direction center portion of the lower section 42C of the sub-frame 42. The other end portion (a lower end portion) of the tension coil spring 40 is anchored to a seat width direction center portion of a rear frame 19 provided to the rear end portion of the seat cushion frame 18. The tension coil spring 40 biases the seat width direction center portion of the lower section 42C of the sub-frame 42 toward the seatback lower side and toward the seatback rear side.

In the seatback 14 with the above configuration, the sub-frame 42 of the backrest section 34 is supported by the wires 74, 76, 78 with respect to the seatback frame 32. The back of an occupant leaning against the seatback 14 is supported by the plural cross-cord members 62 provided stretching across the sub-frame 42, the upper end cross-cord member 58 provided stretching across the upper end portion of the seatback frame 32, and the net form member 64. The backrest section 34 of the seatback 14 is formed with a size capable of supporting the lumbar spine and the thoracic spine (in this example, the entire lumbar spine and a large part of the thoracic spine) of the occupant.

Since the backrest section 34 is suspended from the seatback frame 32 through the suspension section 36, the backrest section 34 is capable of swiveling with respect to the seatback frame 32 within a range over which the wires 74, 76, 78 deflect, extend, or contract. This swiveling includes swiveling (swinging) in the seat width direction about a swivel axis L2 running along the seatback front-rear direction (a hypothetical line, see FIG. 2), and swiveling about a swivel axis L3 running along the seatback up-down direction (a hypothetical line, see FIG. 2).

This swiveling in the seat width direction refers to swiveling in the vehicle roll direction about a swivel center C, this being the portion where the cross-cord member 62 disposed at the upper end portion of the backrest section 34 is fixed to the vertical-cord portion 70 and the cross-cord portion 72. Swiveling about a swivel axis running along the seatback up-down direction refers to swiveling in the vehicle yaw direction about the swivel center C that is the fixing portion. The swivel center C is set at the width direction center portion of the seatback 14, at the height at which the thoracic spine of an occupant leaning against the seatback 14 is positioned, facing toward the thoracic spine of the occupant from the seatback rear. In the present exemplary embodiment, the swivel center C is set to face toward the vicinity of the center of the left and right shoulder blades of the occupant from the rear. In practice, the swivel center C is determined by the cross-cord portion 72 of the suspension section 36. Namely, the cross-cord portion 72 may be understood to be a swivel center determination portion.

Note that, in the present exemplary embodiment, the swivel center C is set by seating an AM50 (a human dummy of the $50^{th}$ percentile of American adult males) with a standard posture in the vehicle seat 10, and setting with respect to the position of the thoracic spine of the AM50.

In the present exemplary embodiment, when the backrest section 34 swivels in the seat width direction with respect to the seatback frame 32, the tension coil spring 40 spanning across between the lower section 42C of the sub-frame 42 and the rear frame 19 of the seat cushion frame 18 is imparted with tensional force and extends. Thus the backrest section 34 that has swiveled in the seat width direction with respect to the seatback frame 32 automatically returns to a center position (the position illustrated in FIG. 1 to FIG. 3) of the swiveling range in the seat width direction with respect to the seatback frame 32 due to the biasing force of the tension coil spring 40, and is retained in the center position during normal operation.

In the present exemplary embodiment, in a state in which an occupant seated in the vehicle seat 10 with a standard posture leans against the seatback 14, the center of the integral values of a seated pressure distribution on the backrest section 34 (hereafter referred to as the force application point) is set so as to be positioned in the vicinity of the first thoracic vertebra of the occupant. Moreover, the force application point is set so as to be positioned slightly toward the lower side than the center of gravity of the upper body of the occupant.

Operation and Advantageous Effects

Explanation follows regarding operation and advantageous effects of the first exemplary embodiment.

In the vehicle seat 10 with the above configuration, the seatback 14 includes the backrest section 34 supporting the back of an occupant. The backrest section 34 is coupled to the seatback frame 32 by the suspension section 36 so as to be capable of swiveling with respect to the seatback frame 32. Plural locations (three in this example) at the outer peripheral side of the backrest section 34 are coupled to the seatback frame 32 by the wires 74, 76, 78. The wires 74, 76, 78 support the backrest section 34 with respect to the seatback frame 32, and permit swiveling as described above.

Since the plural locations at the outer peripheral side of the backrest section 34 are supported by the seatback frame 32 through the wires 74, 76, 78 in this manner, load input from an occupant to the backrest section 34 can be dispersed. Thus the vehicle seat 10 contributes to securing rigidity against load input from the occupant to the backrest section 34 while the vehicle is stationary and while running (while advancing, accelerating, turning, and the like), more efficiently than hitherto.

In the present exemplary embodiment, the thoracic spine and the lumbar spine of an occupant leaning against the seatback 14 are supported by the backrest section 34 of the seatback 14. The swivel center C of the backrest section 34 is set at the height at which the thoracic spine of the occupant is positioned, and is positioned further to the seatback upper side than the force application point of supporting reactive force imparted to the occupant by the backrest section 34 and the center of gravity of the upper body of the occupant.

Thus, for example, when an external force F1 (hereafter referred to as lateral force F1, see FIG. 5) in the seat width direction acts on the upper body of the occupant due to turning of the vehicle, perturbation from the road surface, or the like, a moment M of force is generated with a moment arm length of the distance between the swivel center C and a force application point FP. Due to generation of the moment M, a force (friction force) acts between the back of the occupant and the backrest section 34 in a direction running along the seatback shear direction, suppressing the upper body of the occupant from tilting toward the direction in which the lateral force F1 acts. This force acts over the entire contact portion between the back of the occupant and the backrest section 34, and in particular acts toward the back from the surface on which the thoracic spine is seated with high seating pressure. The backrest section 34 thereby swivels about the swivel center C in the direction the lateral force F1 acts (see the backrest section 34 illustrated by solid lines in FIG. 4).

Figure 5:
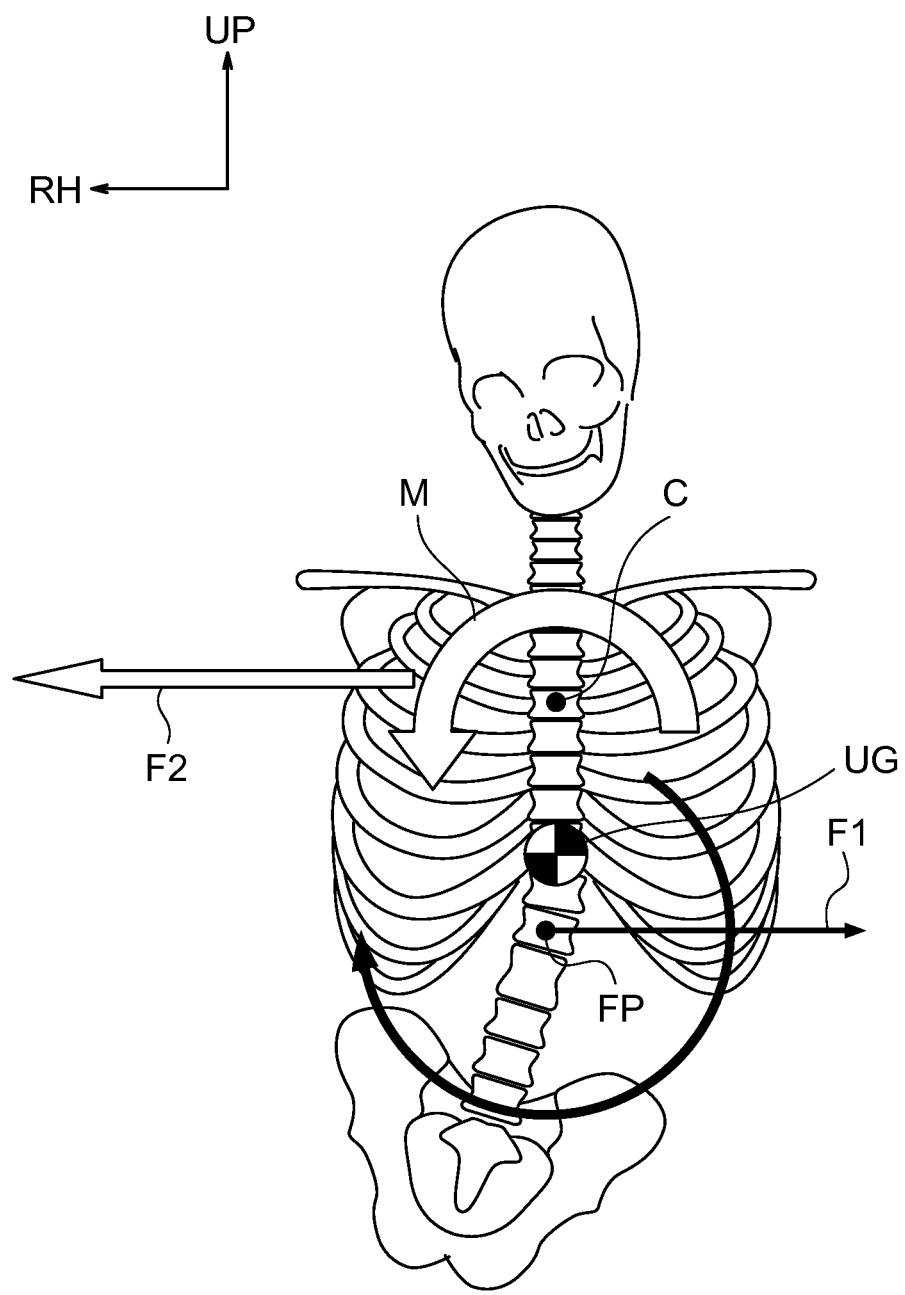
FIG. 5 is a front view illustrating a portion of the skeleton of an occupant seated in the vehicle seat, for explaining a situation when an external force in the seat width direction is acting on the occupant.

When this occurs, as illustrated in FIG. 5, the occupant receives a supporting force F2 in the seat width direction from the backrest section 34 in the vicinity of the swivel center C positioned further to the seatback upper side than the upper body center of gravity UG, while the vicinity of the force application point FP (the first thoracic vertebra vicinity) is, together with the backrest section 34, displaced in the direction of action of the lateral force F1. Thus the supporting force F2 can be made to act in the seat width direction at a higher position in the upper body of the occupant (in this example, the chest that is a higher position than the center of gravity UG). Moreover, the rigidity of the upper body can be increased by the spine of the occupant curving so as to protrude toward the direction of action of the lateral force F1. Namely, rigidity of the occupant in the seat width direction can be increased by extending the trunk side muscle in the direction of action of the lateral force F1, and contracting the trunk side muscle at the opposite side to the direction of action of the lateral force F1. This contributes to improving the posture retention ability of the occupant.

Figure 7:
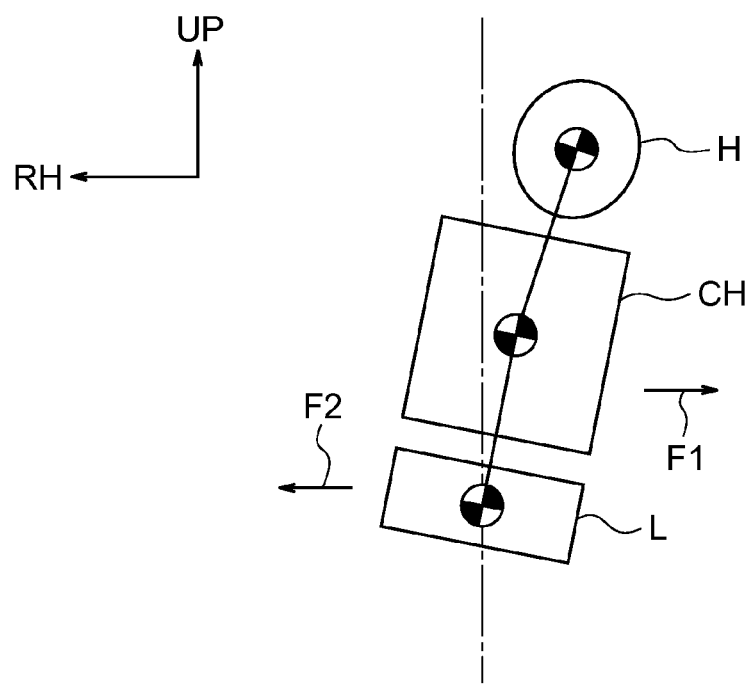
FIG. 7 is a schematic view for explaining a situation when an external force in the seat width direction has acted on an occupant seated in a general vehicle seat.

Note that, as illustrated in FIG. 7, in a seatback of a general vehicle seat in which a backrest section supporting the back of an occupant is fixed to a seatback frame, the supporting force F2 in the seat width direction from the seatback is born by the vicinity of the lumbar region (lumbar spine) L of the occupant when the lateral force F1 acts on the upper body of the occupant. In such a case, the efficiency of supporting the upper body in the seat width direction is reduced due to the occupant needing to support the chest CH and the head H that are attempting to move in the direction of action of the lateral force F1 using their own muscle strength. In order to suppress such a reduction in support efficiency, configuration is made in a general seatback such that large side support sections (bulging sections) are set at side sections in the seat width direction, and the upper body of the occupant is supported from the seat width direction by the side support sections. However, it is difficult to combine support performance and seating comfort with such side support sections due to differences in the frame and build of occupants, and also causes an increase in the size of the seatback.

Figure 6:
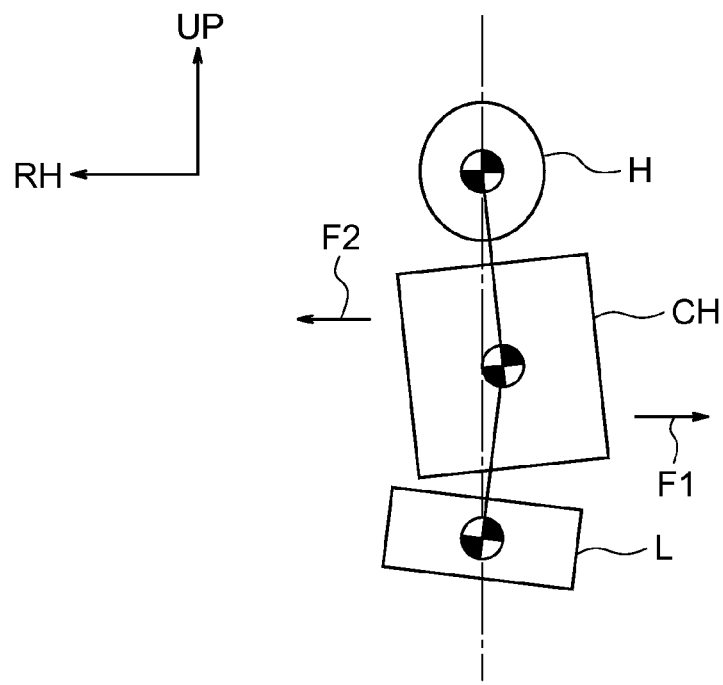
FIG. 6 is a schematic view for explaining a situation when an external force in the seat width direction has acted on an occupant seated in the vehicle seat.

In contrast, in the present exemplary embodiment as illustrated in FIG. 6, the chest CH of the occupant bears the supporting force F2 in the seat width direction from the seatback 14, enabling a reduction in the need for the occupant to support the chest CH using muscle strength. Moreover, as illustrated in FIG. 6, the vicinity of the first thoracic vertebra of the occupant moves in the direction of action of the lateral force F1, together with the backrest section 34, such that the chest CH of the occupant moves in the seat width direction in the opposite direction to the head H and the lumbar region L. Since the head H of the occupant thereby tilts toward the opposite direction to the direction of action of the external force, the posture of the head H can be stabilized by balancing component force in the seat width direction acting on the head H due to its weight, against the external force acting on the head in the seat width direction. This thereby enables the necessity for the occupant to support the head H using muscle strength. This accordingly contributes to improving posture retention ability by the occupant when turning or during perturbation. Moreover, the previously described side support sections become unnecessary or can be reduced to a minimum size, thus enabling excellent seating comfort regardless of differences in the frame and build of occupants, and also contributing to a reduction in size of the seatback 14.

In the present exemplary embodiment, since the vehicle seat 10 is the driver seat, swiveling of the backrest section 34 as described above contributes to improving steering operation by the occupant (driver). Namely, the driver performing the steering operation moves the shoulder at the turning direction inside of the vehicle relatively lower in the vehicle up-down direction than the shoulder at the turning direction outside in order to turn the steering wheel. When this is performed, the driver can perform the steering operation in a relaxed posture by bending the spine so as to move the chest in the opposite direction in the seat width direction to the head and the lumbar region (see FIG. 5 and FIG. 6). Regarding this point, in the present exemplary embodiment, bending of the spine and downward movement of the shoulder at the turning direction inside can be promoted by swiveling of the backrest section 34 as described above. This enables the driver performing the steering operation to adopt a relaxed posture, either consciously or unconsciously.

Moreover, moving the shoulder at the turning direction inside rearward relative to the shoulder at the turning direction outside enables the driver to perform the steering operation with a relaxed posture when turning the steering wheel. Regarding this point, in the present exemplary embodiment, swiveling of the backrest section 34 in the vehicle yaw direction with respect to the seatback frame 32 is permitted due to deflection, and extending and contracting of the wires 74, 76, 78, thereby enabling rearward movement of the shoulder at the turning direction inside to be promoted. This enables the steering operation to be still further improved.

In the present exemplary embodiment, the seat unit 24 of the seat cushion 12 is able to swivel in the vehicle roll direction and yaw direction, thus enabling the occupant to turn the pelvis and the shoulder blades in opposites directions in the vehicle roll direction and yaw direction. This enables the occupant to perform the steering operation with a more natural posture, and enables the steering operation performance and posture retention ability of the occupant to be still further improved.

Figure 4:
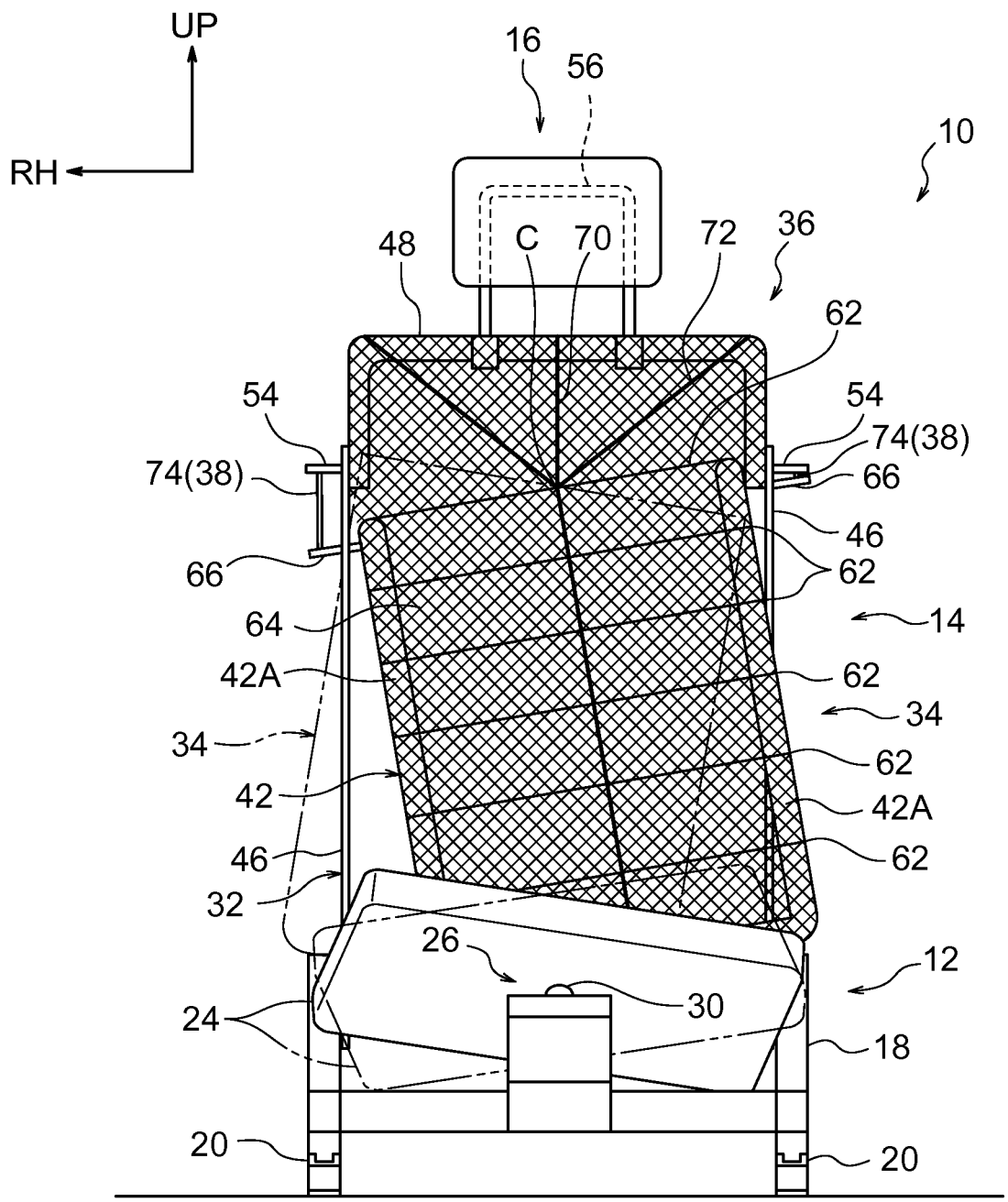
FIG. 4 is a front view corresponding to FIG. 3, illustrating a state in which a seat unit of a seat cushion and a backrest section of a seatback of the same vehicle seat have been swiveled.

Note that FIG. 4 to FIG. 7 show the swiveling positions of the backrest section 34 and the seat unit 24 when lateral force F1 acts in the vehicle left direction, and the behavior of the upper body of the occupant. Since similar applies when lateral force acts in the vehicle right direction (see the double-dotted dashed lines in FIG. 4), except for this being the left-right symmetrical opposite to FIG. 4 to FIG. 7, illustration other than the double-dotted dashed lines in FIG. 4 is omitted.

In the present exemplary embodiment, the location at which the swivel center C is provided in the backrest section 34 is suspended from the seatback frame 32 through the suspension section 36. The backrest section 34 can thereby be coupled so as to be able to swivel (swing) in the seat width direction with respect to the seatback frame 32, thereby enabling a swivel-coupling section with a simple configuration. Moreover, the suspension section 36 is configured by the vertical-cord portion 70 and the cross-cord portion 72, these being linear shaped (cord shaped) members, thereby enabling configuration of the suspension section 36 to be extremely simple.

In the present exemplary embodiment, both seat width direction end portions at the upper end portion of the backrest section 34, and the seat width direction center portion at the lower end portion of the backrest section 34, are coupled to (supported by) the seatback frame 32 at three points through the wires 74, 76, 78 configuring the outer periphery support section 38. This enables support of the backrest section 34 to be stabilized using a simple configuration. Due to tension borne by the wires 74, 76, 78, the backrest section 34 can be supported in the seatback front-rear direction with respect to the seatback frame 32, and swiveling of the backrest section 34 about the swivel center C can be permitted due to deflection, and extending and contracting of the wires 74, 76, 78. This enables the outer periphery support section 38 to be achieved with a simple configuration.

In the present exemplary embodiment, the wires 74, 76 provided at both seat width direction end portions at the upper end portion of the backrest section 34 are positioned further toward the seat width direction outside than both shoulders of the occupant. Thus, when load from one shoulder of the occupant is input to the backrest section 34, the one shoulder becomes the point of action, the wire out of the wires 74, 76 that is further away from the one shoulder becomes the fulcrum, and the wire that is closer to the one shoulder becomes the point of effort, such that the load from the one shoulder can be borne according to the principle of leverage. This enables the rigidity required of the wires 74, 76 to be reduced, and enables rigidity to be efficiently secured against load from the occupant. This point similarly applies to the wire 78 provided to the seat width direction center portion at the lower end portion of the backrest section 34.

Note that, in the vehicle seat device explained in the Related Art, a swiveling mechanism configured by a rotation shaft and a shaft bearing (such as a bearing) is employed in order to support a backrest section so as to be capable of swiveling in the vehicle roll direction with respect to a seat frame. Thus sufficient rigidity needs to be secured in a bracket supporting the rotation shaft and the shaft bearing in order to secure the supporting rigidity of the backrest section in the vehicle yaw direction and the vehicle pitch direction, causing an increase in mass. There is also room for improvement from the perspectives of durability and safety during a collision. Regarding these points, the present exemplary embodiment described above enables rigidity to be efficiently secured against load from an occupant, thus contributing to a reduction in weight, improved durability, and improved collision safety.

In the vehicle seat device explained in the Related Art, the swiveling mechanism is formed at a seat width direction center portion of the backrest section, and moment in the vehicle yaw direction is supported further to the seat width direction inside than both shoulders of the occupant, such that the efficiency of occupant support is reduced due to insufficient in-plane rigidity of the backrest section. Namely, the in-plane rigidity of the backrest section depends on the rigidity of the frame of the backrest section, such that deformation of the frame leads directly to a reduction in supporting reactive force on the occupant. In particular, retention force on the shoulder at the turning direction outside of the vehicle is reduced by deformation of the frame, with the possibility that the ability to support the upper body of the occupant is impaired. Thus, for example, a frame and plural reinforcement portions extending from the frame toward the rotation shaft need to be set in order to secure sufficient in-plane rigidity of the backrest section, resulting in an increase in mass and cost of the manufacturing process.

Regarding this point, in the present exemplary embodiment, both seat width direction end portions at the upper end portion of the backrest section 34 are supported by the seatback frame 32, thereby enabling stabilized support of both shoulders of the occupant, regardless of the in-plane rigidity of the backrest section 34. This contributes to reducing weight and lowering the cost of the backrest section 34. Moreover, the sub-frame 42 provided to the outer peripheral section of the backrest section 34 is supported by the seatback frame 32 through the outer periphery support section 38, and the back of the occupant is supported by the elastic extension-contraction members (the plural cross-cord members 62 and the net form member 64) provided stretching across the sub-frame 42. Thus the back of the occupant can be supported so as to be wrapped around by the extension-contraction members, while securing the rigidity in the backrest section 34 at the outer peripheral section that is coupled to the seatback frame 32 using the sub-frame 42. This enables unintentional misalignment in the seat width direction of the back of the occupant with respect to the backrest section 34 to be suppressed. Moreover, the plural cross-cord members 62 and the net form member 64 fit against the back of the occupant, enabling the pressure borne by the back to be dispersed, thus also enabling the above unintentional displacement to be suppressed.

Note that, in the vehicle seat device described in the Related Art, as described above, only the center portion of the backrest section is coupled to the seatback frame through the rotation shaft and the shaft bearing. In such a configuration, it is difficult to obtain a wide separation in the seatback front-rear direction between the backrest section and the seatback frame, such that it is difficult to set soft surface properties for the backrest section. There is accordingly a steep distribution to the pressure borne by the back of the occupant, such that the center of the pressure distribution is suddenly moved by the occupant changing posture, such as when the vehicle turns, with the possibility of unintentional displacement of the upper body of the occupant in the seat width direction with respect to the backrest section. Regarding this point, in the present exemplary embodiment, the plural cross-cord members 62 and the net form member 64 enable soft surface properties to be set for the backrest section 34, thus enabling such unintentional displacement to be suppressed. This also contributes to generating the previously described moment M as desired.

The present exemplary embodiment includes the tension coil spring 40, which biases the backrest section 34 toward the central side of the swiveling range with respect to the seatback frame 32. This enables the backrest section 34 that has swiveled in the seat width direction with respect to the seatback frame 32 to be automatically returned toward the central side of the swiveling range with respect to the seatback frame 32 by the biasing force of the tension coil spring 40. This enables the orientation of the backrest section 34 to be corrected (set straight in the seatback up-down direction), such as when the occupant alights the vehicle.

In the present exemplary embodiment, the backrest section 34 is suspended from the seatback frame 32 by the suspension section 36, such that the tension coil spring 40 biases the backrest section 34 toward the seatback lower side. This enables positioning of the backrest section 34 in the seatback up-down direction to be established using an extremely simple configuration.

Explanation follows regarding other exemplary embodiments of the present invention. Note that the same reference numerals are applied for configuration and operation essentially the same as the first exemplary embodiment, and explanation thereof is omitted.

Second Exemplary Embodiment

Figure 8:
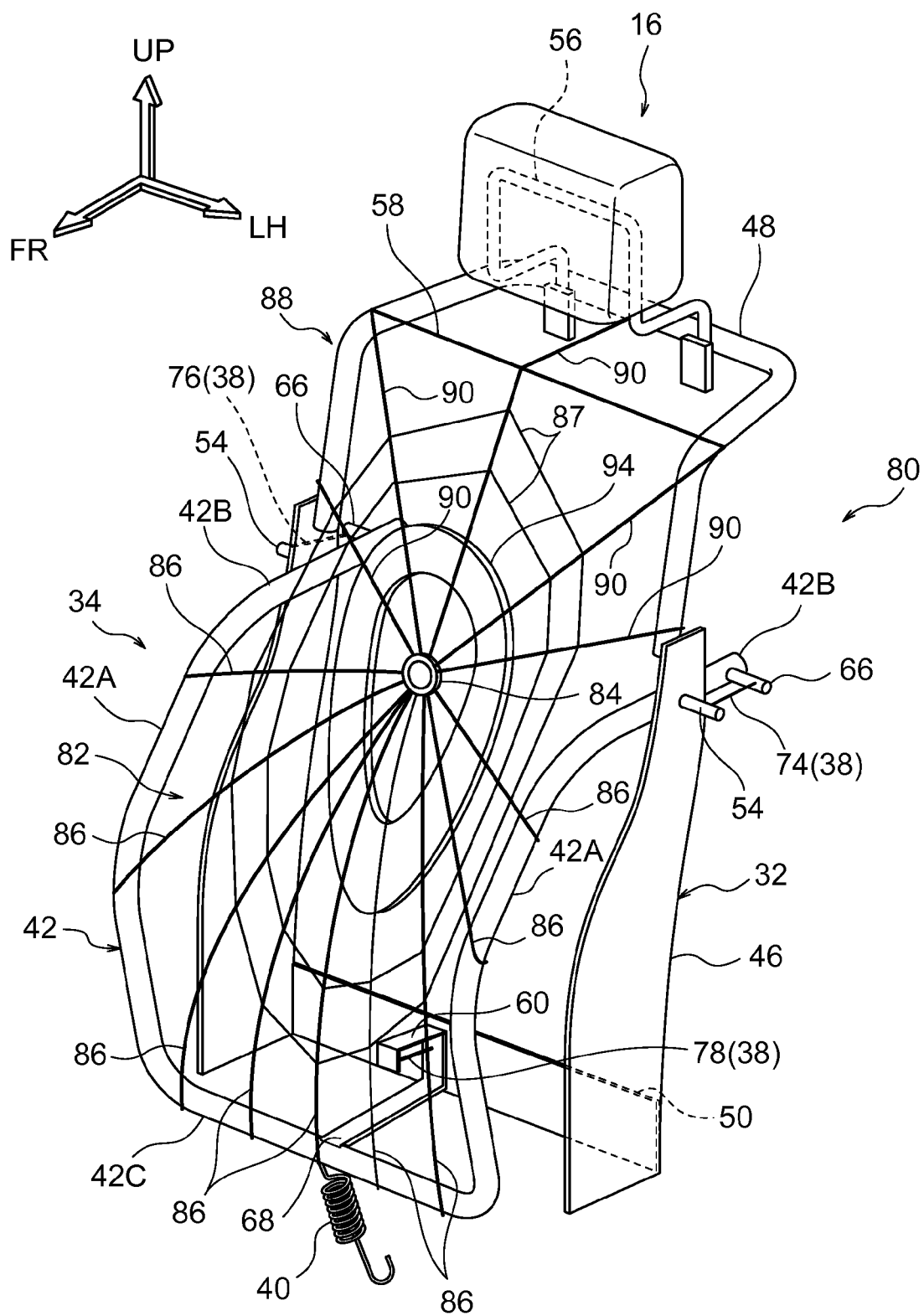
FIG. 8 is a perspective view illustrating a seatback of a vehicle seat according to a second exemplary embodiment of the present invention.

FIG. 8 is a perspective view illustrating a seatback 80 of a vehicle seat according to a second exemplary embodiment of the present invention. In the seatback 80, a radial shaped net section 82, acting as an extension-contraction member, is provided stretched across the sub-frame 42 of the backrest section 34. The radial shaped net section 82 includes a ring member 84 positioned at a seat width direction center portion of an upper portion of the seatback 80, and plural radial cord members 86 extending in a radial shape from the ring member 84 toward the side sections 42A and the lower section 42C of the sub-frame 42.

The ring member 84 is disposed at the width direction center portion of the seatback 14, at a height where the thoracic spine of an occupant leaning against the seatback 14 is positioned. Specifically, the ring member 84 is disposed at a position facing toward the vicinity of the center between the left and right shoulder portions of the occupant, from the rear. The plural radial cord members 86 are flexible and extendible/contractible linear shaped (cord shaped) members, with one end portion thereof fixed to the ring member 84, and the other end portion fixed to the sub-frame 42.

In the seatback 80, a suspension section 88, acting as a swivel-coupling section, is configured including plural radial cord members 90 extending in a radial shape from the ring member 84 toward the upper side of the seatback 80. The radial cord members 90 are flexible and extendible/contractible linear shaped (cord shaped) members, with one end portion thereof fixed to the ring member 84, and the other end portion fixed to the upper frame section 48 of the seatback frame 32. An intermediate portion of the radial cord member 90, from out of the radial cord members 90, positioned at a width direction center portion of the seatback 80 is fixed to the seat width direction intermediate portion of the upper end cross-cord member 58. The backrest section 34 is suspended from the seatback frame 32 by the plural radial cord members 90. The plural radial cord members 86, 90 are coupled together by plural ring shaped thread members 87 set in ring shapes about the ring member 84. The ring shaped thread members 87 are also commonly employed both as configuration members of the radial shaped net section 82 and of the suspension section 88.

In the seatback 80, the plural radial cord members 86, 90 and the ring shaped thread members 87 form a substantially spider web shaped occupant support section, and the back of an occupant leaning against the seatback 80 is supported by the occupant support section. A torque transmission member 94 is provided to the seatback 80 between the ring member 84 and the plural ring shaped thread members 87. The torque transmission member 94 is formed from a resilient body, such as rubber, in a ring shape elongated along the seatback up-down direction, and is fixed to respective intermediate portions of the plural radial cord members 86 and the plural radial cord members 90. Other configuration is similar to that in the first exemplary embodiment.

In the seatback 80 with the above configuration, the backrest section 34 is coupled to the seatback frame 32 through the suspension section 88 and the plural wires 74, 76, 78. The suspension section 88 couples the backrest section 34 to the seatback frame 32 so as to be capable of swiveling in the seat width direction about the ring member 84, and the plural wires 74, 76, 78 couple plural locations (three locations in this example) at the outer peripheral side of the backrest section 34 to the seatback frame 32. The wires 74, 76, 78 cause the backrest section 34 to be supported by the seatback frame 32, and permit the above swiveling. Thus essentially similar operation and advantageous effects to the first exemplary embodiment can be obtained.

Moreover, in the seatback 80, the plural radial cord members 86, 90 are set in a direction intersecting the previously described moment M (see FIG. 5), and the radial cord members 86, 90 are coupled in the generation direction of the moment M by the torque transmission member 94. This enables more of the moment M to be generated, thus enabling the posture retention ability and steering operation performance of the occupant to be improved more than in the first exemplary embodiment.

Third Exemplary Embodiment

Figure 9A:
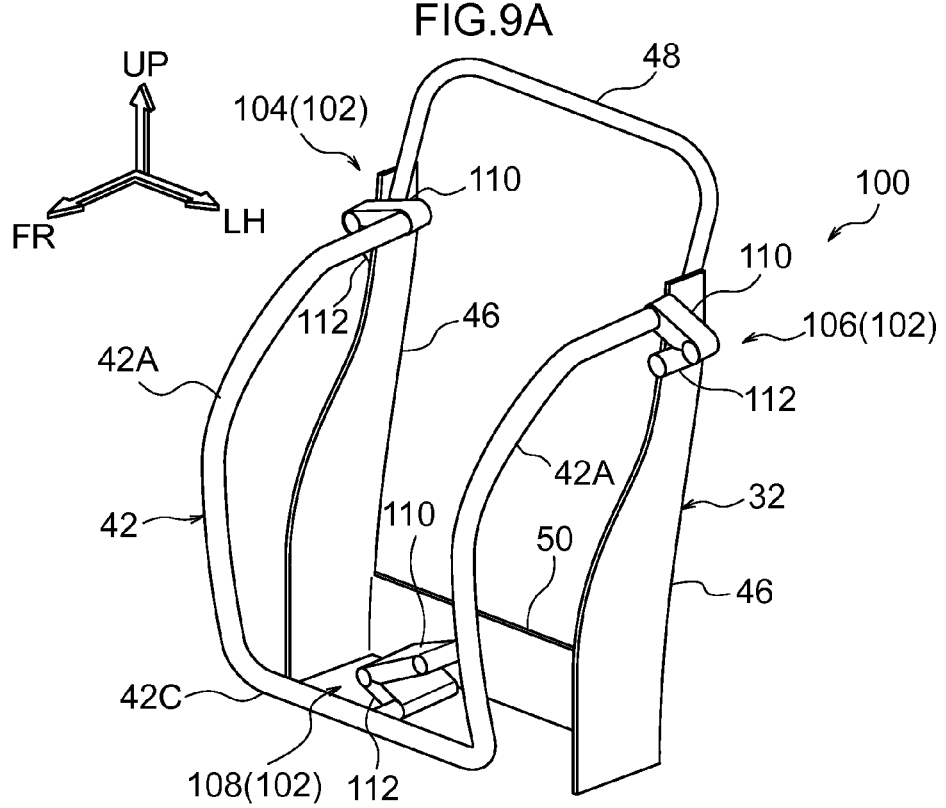
FIG. 9A is a perspective view illustrating part of a configuration of a seatback of a vehicle seat according to a third exemplary embodiment of the present invention.
Figure 9B:
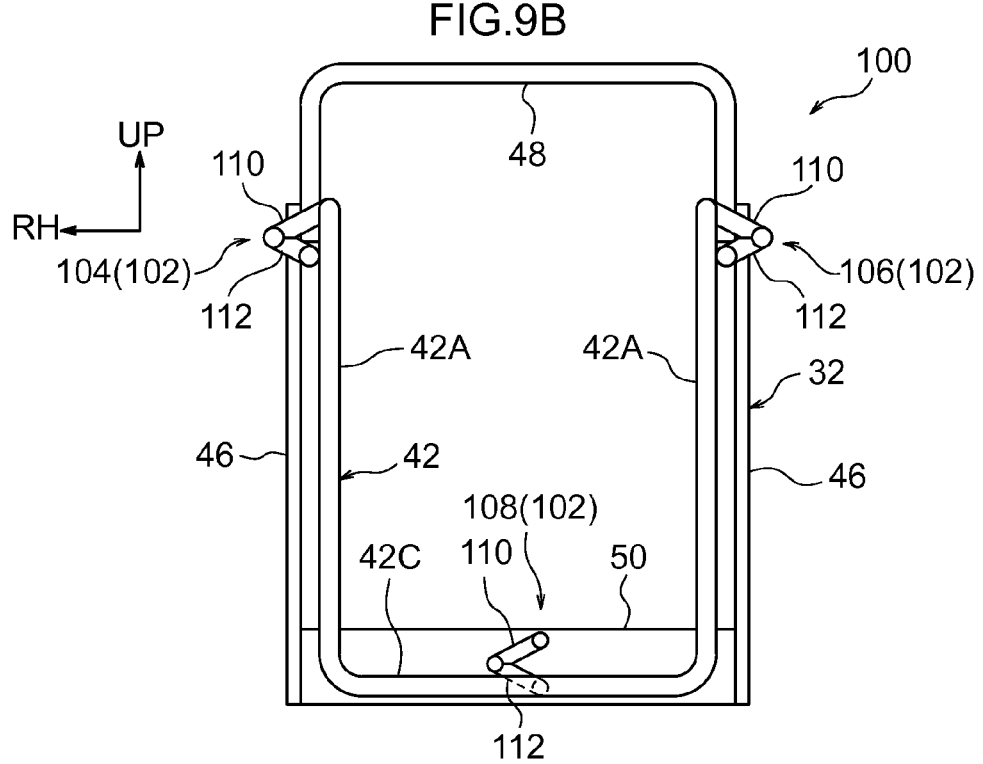
FIG. 9B is a front view illustrating part of a configuration of a seatback according to the third exemplary embodiment.

FIG. 9A is a perspective view illustrating part of a configuration of a seatback 100 of a vehicle seat according to a third exemplary embodiment of the present invention, and FIG. 9B is a front view illustrating the same configuration. In the seatback 100, an outer periphery support section 102 is configured by plural (three in this example) link members 104, 106, 108.

The link members 104, 106 that are provided at both seat width direction end portions of an upper portion of the seatback 100, respectively spanning across between the upper end portions of the left and right side sections 42A of the sub-frame 42, and the upper end portions of the left and right side frame sections 46 of the seatback frame 32. The link members 104, 106 each includes a first link 110 having one end portion rotatably coupled to the upper end portion of the respective side section 42A, and a second link 112 having one end portion rotatably coupled to the upper end portion of the respective side frame section 46. The other end portions of the first link 110 and the second link 112 are rotatably coupled to each other at the seat width direction outside with respect to the one end portions of the link members 104, 106.

The link member 108 that is provided at a seat width direction center portion at the lower end portion of the seatback 100, spans across between a seat width direction center portion of the lower section 42C of the sub-frame 42 and a seat width direction center portion of the lower frame section 50 of the seatback frame 32. The link member 108 includes a first link 110 having one end portion rotatably coupled to a seat width direction center portion of the lower frame section 50, and a second link 112 having one end portion rotatably coupled to a seat width direction center portion of the lower section 42C. The other end portions of the first link 110 and the second link 112 are rotatably coupled to each other at one seat width direction side with respect to the one end portions of the links 110, 112.

In the link members 104, 106, 108 described above, the rotation axes of the first links 110 and the second links 112 run along the seatback front-rear direction. The link members 104, 106, 108 cause the sub-frame 42 to be supported by the seatback frame 32, and permit displacement of the sub-frame 42 in the seatback shear direction with respect to the seatback frame 32 within a specific range. Configuration of the present exemplary embodiment other than that described above is similar to the first exemplary embodiment. The present exemplary embodiment also exhibits essentially similar operation and advantageous effects to the first exemplary embodiment.

Fourth Exemplary Embodiment

Figure 10A:
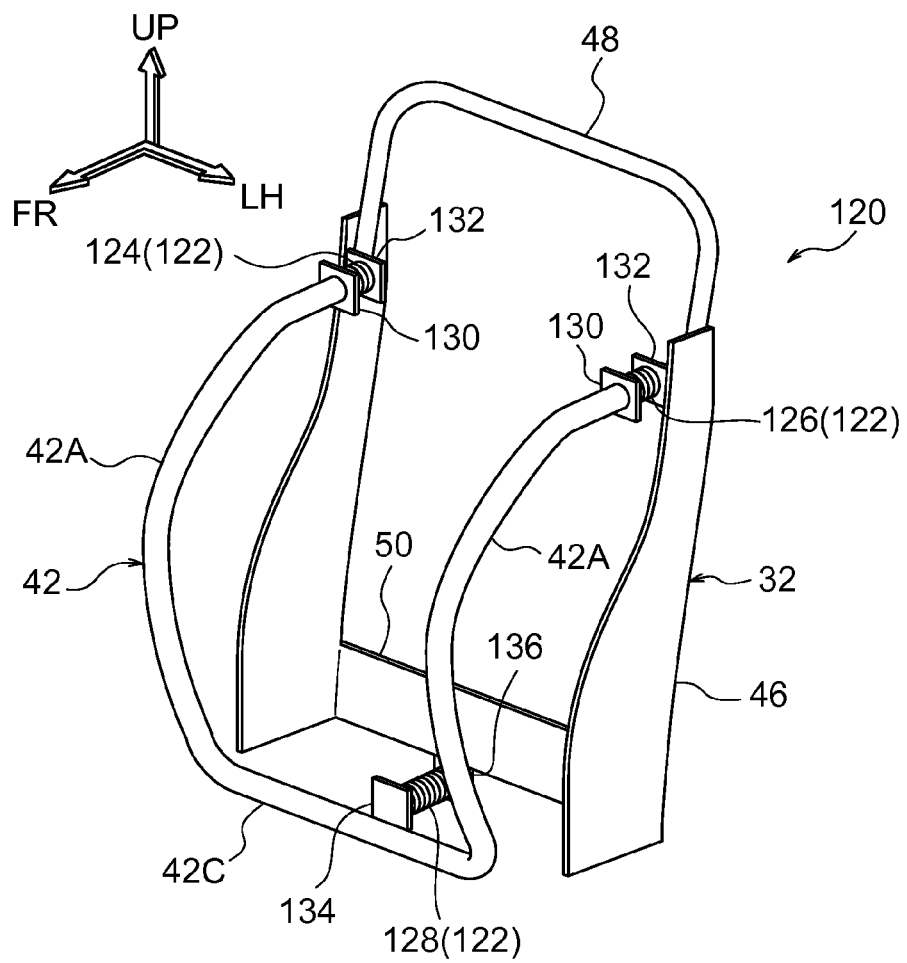
FIG. 10A is a perspective view illustrating part of a seatback of a vehicle seat according to a fourth exemplary embodiment of the present invention.

FIG. 10A is a perspective view illustrating part of a configuration of a seatback 120 of a vehicle seat according to a fourth exemplary embodiment of the present invention. In the seatback 120, an outer periphery support section 122 is configured by plural (three in this example) coil spring shaped members 124, 126, 128. Other configuration is similar to the seatback 14 according to the first exemplary embodiment.

The coil spring shaped members 124, 126, 128 have a similar configuration to a SLINKY (registered trademark), this being a coil spring toy, and are formed in tensile coil spring shapes. The coil spring shaped members 124, 126, 128 are provided to both seat width direction end portions at an upper portion of the seatback 120, and a seat width direction center portion at a lower end portion of the seatback 120, respectively, oriented such that the axial directions run along the seatback front-rear direction. One axial direction end portions of the coil spring shaped members 124, 126 provided to both seat width direction end portions at the upper portion of the seatback 120 are fixed to the upper end portions of the respective left and right side sections 42A through plate shape brackets 130, and the other axial direction end portions are fixed to the upper end portions of the respective left and right side frame sections 46 through plate shaped brackets 132.

One axial direction end portion of the coil spring shaped member 128 provided to the seat width direction center portion at the lower end portion of the seatback 120 is fixed to a seat width direction center portion of the lower section 42C through a plate shaped bracket 134, and the other axial direction end portion is fixed to a seat width direction center portion of the lower frame section 50 through a plate shaped bracket 136.

Figure 10B:
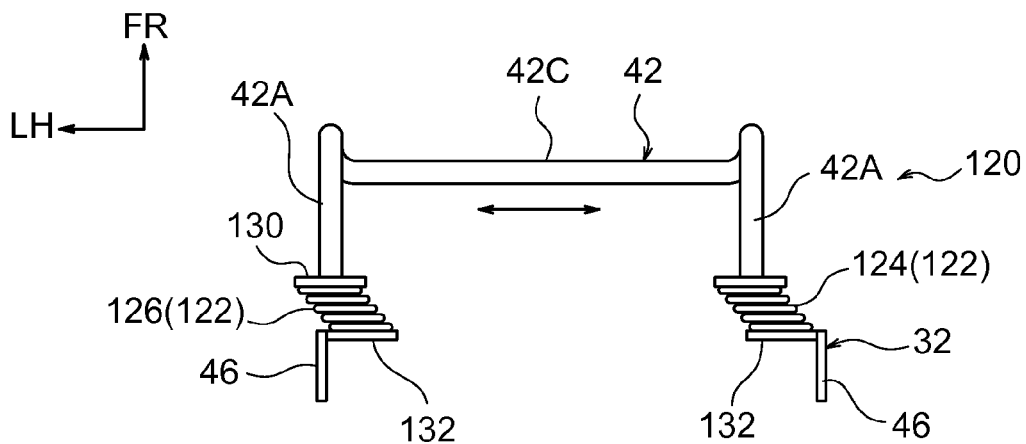
FIG. 10B is a plan view illustrating part of a configuration of a seat back according to the fourth exemplary embodiment.

The coil spring shaped members 124, 126, 128 cause the sub-frame 42 to be supported by the seatback frame 32, and permit displacement of the sub-frame 42 in the seatback shear direction with respect to the seatback frame 32 within a specific range (see FIG. 10B). Other configuration of the present exemplary embodiment is similar to the first exemplary embodiment. The present exemplary embodiment also exhibits essentially similar operation and advantageous effects to the first exemplary embodiment.

Fifth Exemplary Embodiment

Figure 11:
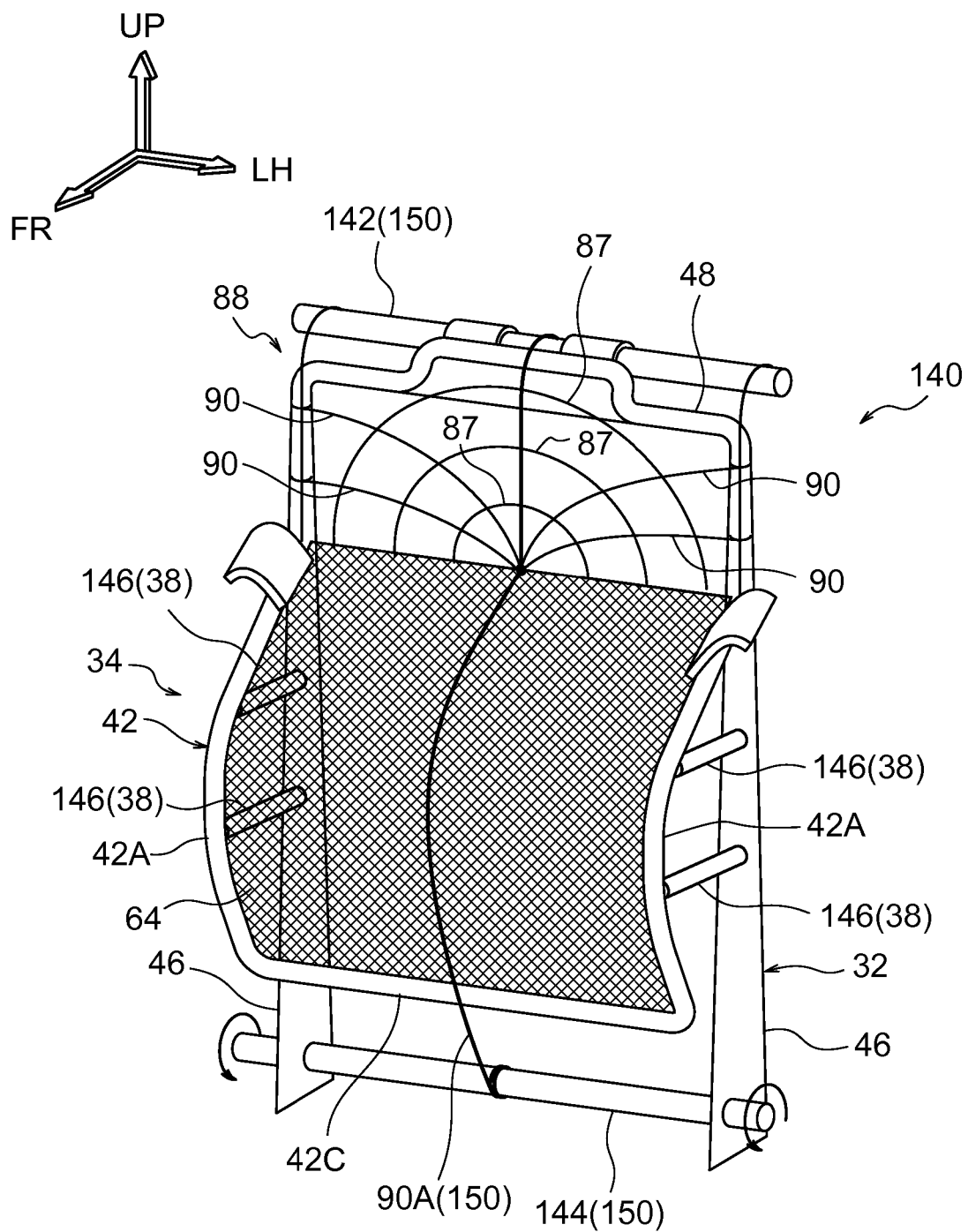
FIG. 11 is a perspective view of a seatback of a vehicle seat according to a fifth exemplary embodiment of the present invention.

FIG. 11 is a perspective view illustrating a configuration of a seatback 140 of a vehicle seat according to a fifth exemplary embodiment of the present invention. In the seatback 140, take-up shafts 142, 144 are provided at the upper end portion and the lower end portion of the seatback frame 32, respectively. The take-up shafts 142, 144 are each disposed oriented with their axial directions running along the seat width direction. An axial direction intermediate portion of the upper side take-up shaft 142 is rotatably supported by the upper end portion of the upper frame section 48, and each axial direction end portion of the lower side take-up shaft 144 is rotatably supported by the respective left or right side frame section 46.

In the present exemplary embodiment, the suspension section 88 is formed in a substantially spider web shape by the plural radial cord members 90 and ring shaped thread members 87. From out of the plural radial cord members 90, the radial cord member 90 positioned at the width direction center portion of the seatback 80 (hereafter referred to as vertical-cord member 90A) extends toward the upper end side of the seatback 140, and an upper end side thereof is anchored to the previously described take-up shaft 142, so as to be wound onto the take-up shaft 142 by rotation of the take-up shaft 142. The vertical-cord member 90A extends toward the lower end side of the sub-frame 42, and is fixed to the seat width direction center portion at the lower section 42C of the sub-frame 42. The vertical-cord member 90A also extends toward the lower end side of the seatback frame 32, and a lower end portion thereof is anchored to the previously described take-up shaft 144, so as to be wound onto the take-up shaft 144 by rotation of the take-up shaft 144.

In the present exemplary embodiment, a pair of upper and lower support members 146 are provided to both a left side portion and a right side portion of the seatback 140, and the outer periphery support section 38 is configured by the support members 146. The support members 146 are each formed in a circular bar shape, and are disposed oriented with their axial directions running along the seatback front-rear direction. One end portion (a front end portion) of each support member 146 is fixed to the side section 42A of the sub-frame 42, and the other end portion (a rear end portion) is fixed to the side frame section 46 of the seatback frame 32, thereby coupling the outer peripheral section of the backrest section 34 to the seatback frame 32. The support members 146 are configured of a material that has greater rigidity in the seatback front-rear direction (a direction at right angles to the seatback plane) than rigidity in the seatback shear direction (such as FINE REVO (registered trademark), a resin resilient body manufactured by Aisin Seiki Co., Ltd.). Thus configuration is such that the sub-frame 42 is supported, with rotation about the swivel center C of the sub-frame 42 in the seat width direction with respect to the seatback frame 32 permitted. Thus essentially the same operation and advantageous effects can be obtained as in the first exemplary embodiment.

Moreover, in the present exemplary embodiment, the vertical-cord member 90A is moved in the seatback up-down direction by rotating the take-up shafts 142, 144. This thereby enables the position of the swivel center C in the seatback up-down direction to be varied (adjusted) within a specific range. Namely, the take-up shafts 142, 144 and the vertical-cord member 90A configure an adjustment mechanism 150 for adjusting the up-down position of the swivel center C. This enables the swivel properties of the backrest section 34 to be varied (adjusted) according to the build, preferences, and so on of the occupant.

Supplementary Explanation of Exemplary Embodiments

In each of the above exemplary embodiments, the backrest section 34 is configured suspended from the seatback frame 32 by the suspension section 36, 88 that is the swivel-coupling section. However, configuration is not limited thereto, and configuration of the swivel-coupling section may be varied as appropriate. For example, a swivel-coupling section may be configured by a swiveling mechanism formed of a rotation shaft and a shaft bearing. Such cases may, for example, adopt a configuration in which there are two coupling locations between a backrest section and a seatback frame due to the outer periphery support section, and the backrest section is supported by the seatback frame at three points, these being the two locations and the swiveling mechanism.

In each of the above exemplary embodiments, the backrest section 34 is configured so as to swivel in the seat width direction about the swivel center C with respect to the seatback frame 32. However, configuration is not limited thereto, and a configuration may be adopted in which a support face of the seatback that supports an occupant (the surface layer: the leant-on-face) undergoes in-plane deformation about an in-plane deformation center set at the height of the position of the thoracic spine of the occupant. The previously described moment M can also be generated in such a case, thus enabling a contribution to improving the posture retention ability and steering operation performance of the occupant.

In each of the above exemplary embodiments, the backrest section 34 is configured so as to be capable of supporting the thoracic spine and the lumbar spine of the occupant; however configuration is not limited thereto. A backrest section may be configured as capable of supporting at least the lumbar spine from the group of the thoracic spine and the lumbar spine of the occupant.

Various other modifications may be implemented within a range not departing from the spirit of the present invention. Obviously, the scope of rights encompassed by the present invention is not limited by each of the above exemplary embodiments.

What is claimed is:

1. A vehicle seat comprising:
   a seatback frame;
   a backrest section that supports a back of an occupant;
   a swivel-coupling section that couples the backrest section to the seatback frame in such a manner that the backrest section is capable of swiveling with respect to the seatback frame in a seat width direction; and
   a plurality of outer periphery support sections that each couple at a different location at an outer peripheral side of the backrest section to a different location of the seatback frame, that support the backrest section with respect to the seatback frame, and that permit the backrest section to swivel.

2. The vehicle seat of claim 1, wherein:
   the backrest section is capable of supporting at least a lumbar spine of the occupant from a group consisting of a thoracic spine and the lumbar spine; and
   a center of swiveling of the backrest section is set at a height at which the thoracic spine of the occupant is positioned.

3. The vehicle seat of claim 1, wherein the swivel-coupling section is a suspension section that suspends the backrest section from the seatback frame at a location of a center of swiveling of the backrest section.

4. The vehicle seat of claim 1, wherein:
   the outer periphery support sections couple both end portions in the seat width direction of the backrest section to the seatback frame at an upper end portion of the backrest section, and couple a center portion in the seat width direction of the backrest section to the seatback frame at a lower end portion of the backrest section.

5. The vehicle seat of claim 1, wherein:
   the backrest section includes a sub-frame that configures an outer peripheral section of the backrest section and that is coupled to the seatback frame by the swivel-coupling section and the outer periphery support section, and an elastic extension-contraction member that is stretched across the sub-frame.

6. The vehicle seat of claim 1, further comprising a biasing member that biases the backrest section toward a central side of a swiveling range with respect to the seatback frame.

7. The vehicle seat of claim 1, further comprising an adjustment mechanism that adjusts a position in a seatback up-down direction of a center of swiveling of the backrest section.

* * * * *